United States Patent
Garm et al.

(10) Patent No.: US 9,423,036 B1
(45) Date of Patent: Aug. 23, 2016

(54) THERMOSTATIC RADIATOR VALVE INSERT

(75) Inventors: Fester Kresten Garm, Silkeborg (DK); Soeren Holm Soerensen, Galten (DK)

(73) Assignee: Danfoss A/S, Nordborg (DK)

( * ) Notice: Subject to any disclaimer, the term of this patent is extended or adjusted under 35 U.S.C. 154(b) by 1057 days.

(21) Appl. No.: 13/074,105

(22) Filed: Mar. 29, 2011

(51) Int. Cl.
G05D 23/02 (2006.01)
G05D 23/12 (2006.01)
F15B 13/00 (2006.01)
F16K 1/52 (2006.01)

(52) U.S. Cl.
CPC ...................................... *F16K 1/52* (2013.01)

(58) Field of Classification Search
CPC ........ F16K 1/52; F16K 31/60; G05D 23/023
USPC .................. 236/93 R, 102; 137/271, 269
See application file for complete search history.

(56) References Cited

U.S. PATENT DOCUMENTS

| 4,454,982 | A | * | 6/1984 | Reick et al. | 236/92 R |
| 4,465,040 | A | * | 8/1984 | Pelizzoni | 123/188.9 |
| 4,492,219 | A | * | 1/1985 | Schoenheimer et al. | 126/586 |
| 4,617,957 | A | * | 10/1986 | Sandling | 137/315.26 |
| 4,744,735 | A | * | 5/1988 | Niemand | 417/533 |
| 5,582,201 | A | * | 12/1996 | Lee et al. | 137/454.2 |
| 7,114,661 | B2 | * | 10/2006 | Goedde | 236/93 R |
| 7,617,989 | B2 | * | 11/2009 | Caleffi | 236/99 R |
| 8,028,356 | B2 | * | 10/2011 | Kao et al. | 4/678 |
| 2006/0231637 | A1 | * | 10/2006 | Schmitt | B01F 5/0268 236/12.11 |
| 2008/0245881 | A1 | * | 10/2008 | Peric | 236/93 R |
| 2012/0049099 | A1 | * | 3/2012 | McCarty | 251/366 |

FOREIGN PATENT DOCUMENTS

FR 2533656 * 9/1982 ............. F16K 27/02

* cited by examiner

*Primary Examiner* — Henry Crenshaw
(74) *Attorney, Agent, or Firm* — McCormick, Paulding & Huber LLP

(57) ABSTRACT

A thermostatic radiator valve insert may be installed into an existing valve body within a fluid system. The insert may include an actuator that can be connected to a sensor, a thermostatic element or other controller, and may replace components of a manually operable valve. By removing the internal components of a manually operable valve from a valve body and installing a thermostatic radiator valve insert of the present invention therein, automatic control features may be implemented in a fluid system without requiring a full replacement of the manually operated valve or any associated piping. The insert may operate using some of the original components of the manually operated valve, and may also include replacement parts such as seating surfaces.

17 Claims, 6 Drawing Sheets

THERMOSTATIC RADIATOR VALVE INSERT

BACKGROUND OF THE INVENTION

1. Field of the Invention

The present invention relates to valves for use in fluid systems, and to methods for controlling fluid flow. More particularly, the present invention relates to improvements which may be easily installed into fluid systems, such as heating systems, in order to provide for automated precision-controlled operation of system components that are presently operated manually.

2. Description of the Related Art

Many types of heating systems may be used to provide heat to spaces within homes and buildings, and can typically include a heat exchanger, distribution piping, valves and radiators. Closed-loop heating systems operate by circulating a fluid from a heat exchanger, such as a boiler, through piping to one or more radiators that may be located in one or more spaces. Hydronic heating systems typically use water as the heat transfer medium and may also include recirculation pumps, while steam heating systems use steam as the heat transfer medium and do not require such pumps.

Throughout the Twentieth Century, closed-loop heating systems were regularly constructed in homes and buildings, particularly in older cities in the eastern United States. Such systems often include manual operating valves for controlling the flow of fluid into radiators, and, therefore, the radiation of heat into the space. While manual operating valves enable occupants to customize fluid flow to an individual space, such valves are unable to automatically respond to changes in the environment inside or outside the space, including the opening or closing of windows; varying environmental conditions such as solar gains or wind exposure; internal activities such as cooking, appliance use or increased occupancy; or the individual habits, ages, preferences or health concerns of occupants of the space. Moreover, enabling occupants to modify fluid flow to one particular space can have ramifications on the fluid flow and heat loading in surrounding spaces, and may create an imbalance in heat loading across the entire system.

Thermostatic radiator valves ("TRV") were first conceived in the mid-1940s as a way to automate the control of fluid flow to a radiator and, therefore, to automate the control of the temperature in the space in which the radiator is located. TRVs are self-acting capillary actuated devices that modulate the flow of fluid in response to variations in room temperatures or according to preset instructions, and typically include a valve, a sensor or other automatic controller, and an actuator. The sensor senses the temperature in a space and is connected to the actuator, which is adapted to control the operation of the TRV. When the temperature sensed in a space falls below or rises above a set point, the sensor will direct the actuator to open or close the TRV, as necessary, in order to increase or decrease fluid flow to a radiator. The actuator may also be directed to operate the TRV based on a preset schedule or according to other instructions. TRVs are typically used in hydronic and steam systems, and can increase the efficiency of such systems by reducing heating losses and by rapidly responding to changes in temperature, but generally do not require any manual action on the part of an operator.

Because a TRV can provide many advantages in terms of ease of operation and improved system efficiency, it is desirable to replace manually operated valves in older closed-loop systems with TRVs. However, retrofitting fluid systems that are installed in older structures, particularly heating systems that may have been built according to obsolete standards or in unique configurations, can prove to be a major challenge. Piping arrangements, system materials and other variations may have a significant impact on the costs and the difficulties associated with upgrading an existing manually operable system to automatic control.

Accordingly, there exists a need for an easy-to-install TRV insert which may be quickly and inexpensively retrofitted into existing fluid systems, and a simple method for installing TRV inserts into such systems, in order to convert such systems from manual to automatic control.

SUMMARY OF THE INVENTION

In accordance with a first aspect, the present invention is directed to a TRV insert assembly which may be retrofitted into a valve body that is already present within a closed-loop system. The valve insert assembly can provide modern automatic control features to fluid systems that presently operate by manual control. The in-place valve body may be, for example, part of a manually operated valve within the heating system. The manually operated valve may include components such as a handle, valve packing, a valve stem, a valve plate and a valve seat, which may be removed to accommodate the installation of the TRV insert assembly. When installed, the TRV insert assembly may be used to isolate or initiate flow through a fluid system, and may also be used to provide for automatic regulation of the rate of flow through the system.

In some embodiments of the present invention, a TRV insert assembly may include an actuator, a valve stem and a replacement valve member, such as a valve plate, mounted to the valve stem. The insert assembly may be mounted to a valve body with an adapter, which may be threaded, after the internal components of the manually operated valve have been removed. Additionally, the replacement valve member may be shaped in order to mate with an original valve seat within the valve body, and the dimensions of the insert assembly may be sized to fit within the existing valve body. Moreover, the actuator may initiate flow through the valve by raising the replacement valve member from the original valve seat, and may isolate flow through the valve by lowering the replacement valve member onto the original valve seat.

In other embodiments of the present invention, a TRV insert assembly may include an actuator, a valve stem, a replacement valve member mounted to the valve stem, and an inner housing. The insert assembly may be installed into an existing valve body such that a surface of the inner housing forms a seal with the original valve seat. The insert assembly may include a replacement valve seat within the inner housing, and the replacement valve member may mate with the replacement valve seat in order to control or regulate fluid flow through the valve.

In some other embodiments of the present invention, an insert assembly may include an actuator, a valve stem, a replacement valve member mounted to the valve stem, and an inner housing. The inner housing may be a tube-like structure that forms a seal with the original valve seat within the valve body, and also forms a portion of the flow path through the valve. The inner housing may also include a replacement valve seat within the inner valve housing, and the replacement valve member may mate with the replacement valve seat in order to control or regulate fluid flow through the valve.

One advantage of the TRV insert assemblies of the present invention is that they permit the conversion of fluid systems from manual to automatic operation and control quickly and easily, without requiring any welding or cutting of piping or valve parts. Another advantage associated the insert assemblies of the present invention is that they may be utilized to improve the efficiency of fluid systems, such as heating systems, for a relatively low cost compared to a full-scale replacement of valves or piping within the systems.

These and other advantages of the present invention, and/or of the currently preferred embodiments thereof, will become more readily apparent in view of the following detailed description of the currently preferred embodiments and accompanying drawings.

DESCRIPTION OF THE SEVERAL VIEWS OF THE INVENTION

DETAILED DESCRIPTION OF THE INVENTION

Figure 1:
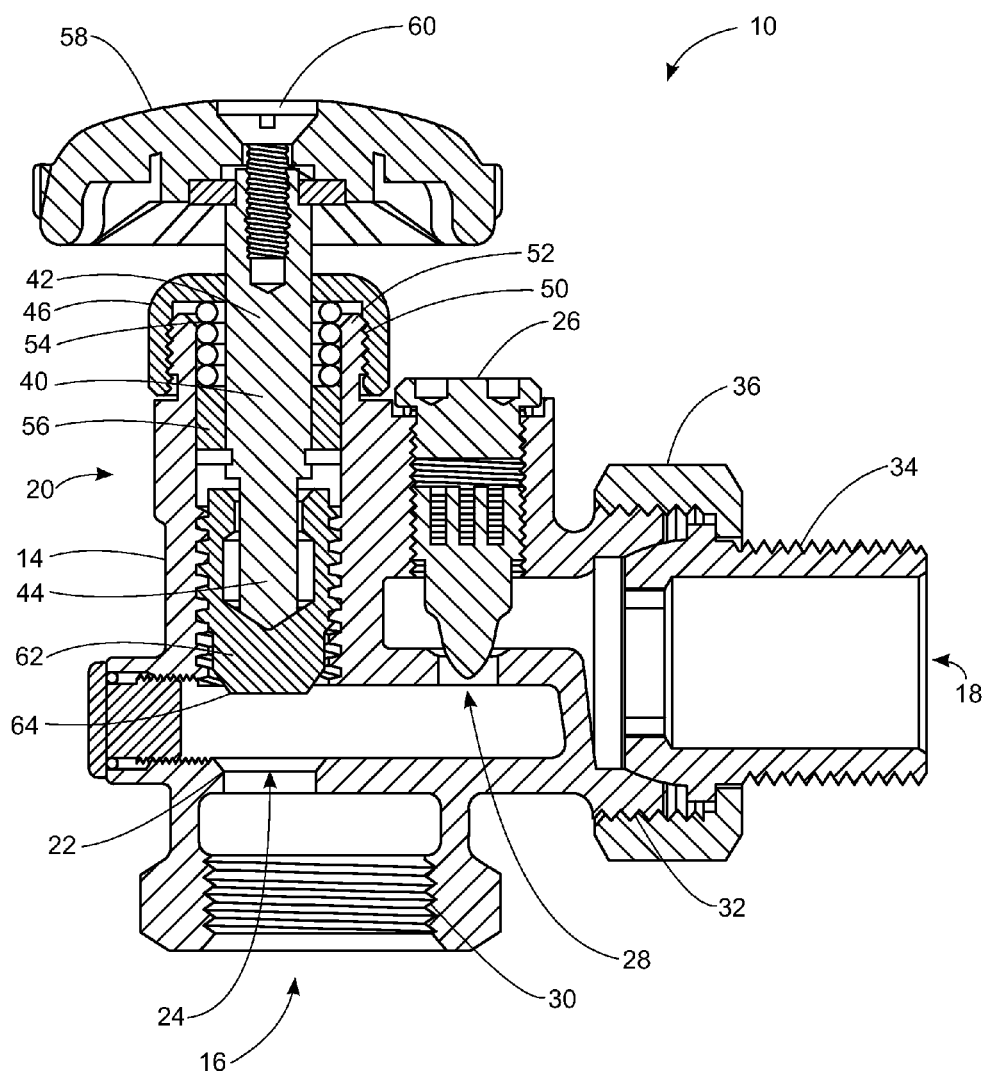
FIG. 1 is a cross-sectional side view of a manually operated valve of the prior art.
Figure 2:
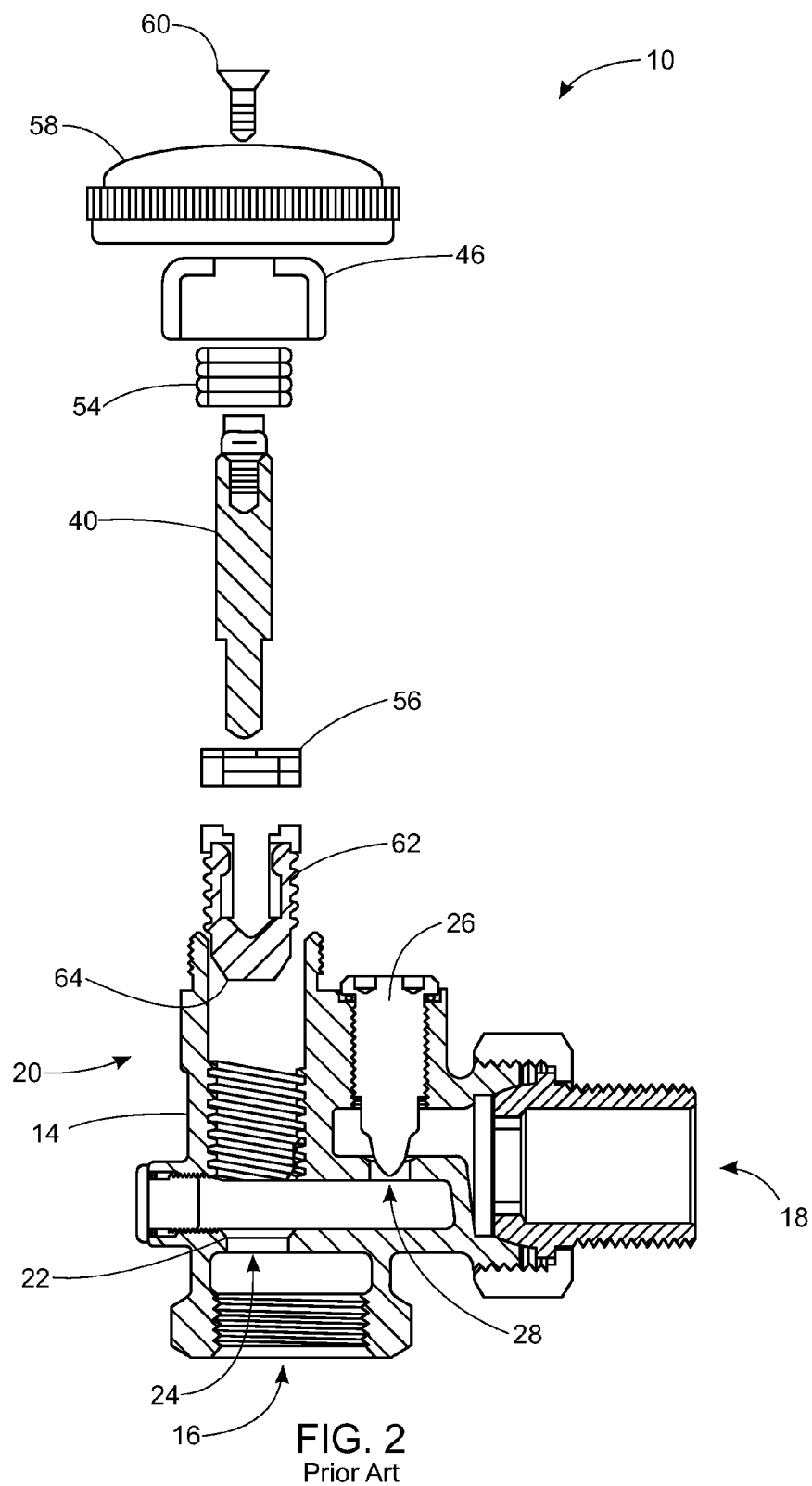
FIG. 2 is an exploded view of the manually operated valve of FIG. 1.

Referring to FIGS. 1 and 2, a conventional manually operated valve 10 is a spring-packed valve that may be a component part of a fluid system, such as a hydronic or steam heating system. The valve 10 includes a valve body 14 having an inlet 16, an outlet 18 and a valve housing 20. The valve body 14 includes a valve seat 22 which defines an opening 24 within the valve body 14. The valve body 14 also includes a regulator 26 and an orifice 28 within the valve body 14. Additionally, the inlet 16 includes an internally threaded connection 30, and the outlet 18 includes an externally threaded connection 32. The externally threaded connection 32 at the outlet 18 is connected to a union nipple 34 by a union nut 36.

The valve 10 further includes a valve stem 40 having a proximal end 42 and a distal end 44 which extends into the valve housing 20. The valve stem 40 is coupled to the valve housing 20 by a packing nut 46, which is fastened to a threaded exterior 50 on a neck 52 of the valve housing 20 and secures a spring 54 and a packing ring 56 within the valve body 14. A handwheel 58 is connected to the proximal end 42 of the valve stem 40 by a fastener 60, and a valve operator 62 is coupled to the distal end 44 of the valve stem 40 within the valve housing 20. The valve operator 62 has a valve plate 64 that is shaped to conform to the valve seat 22 when the valve 10 is closed.

In operation, the valve 10 has a "fully open" position and a "closed" position, and any number of positions between the "fully open" position and the "closed" position. The valve 10 is used to initiate flow by rotating the handwheel 12, typically in a counter-clockwise direction, which lifts the valve plate 64 from the valve seat 22 and permits fluid to flow through a flow path defined within the valve body 14 as extending from the inlet 16 through the opening 24 and the orifice 28 to the outlet 18. The maximum rate of flow through the valve 10 is controlled based on the position of the regulator 26. The valve 10 may be closed by rotating the handwheel 12 in the opposite direction, typically in a clockwise direction, which presses the valve plate 64 into the valve seat 22 and places the valve 10 in the closed position. When the valve 10 is closed, fluid is prevented from passing through the valve 10 from the inlet 16 to the outlet 18.

The present invention is directed to TRV inserts that may be installed into valve bodies, such as the valve body 14 of the valve 10 shown in FIG. 1, which are already present within a fluid system. By removing the internal components of a manually operable valve from a valve body, and installing a TRV insert into the valve body, the automated control features of TRVs may be implemented in a fluid system more quickly, easily and inexpensively than by replacing a manually operated valve in its entirety, because installing a TRV insert of the present invention into an in-place valve body may generally be performed without cutting or welding pipes or valve parts, and may require fewer materials for fabrication.

Figure 3:
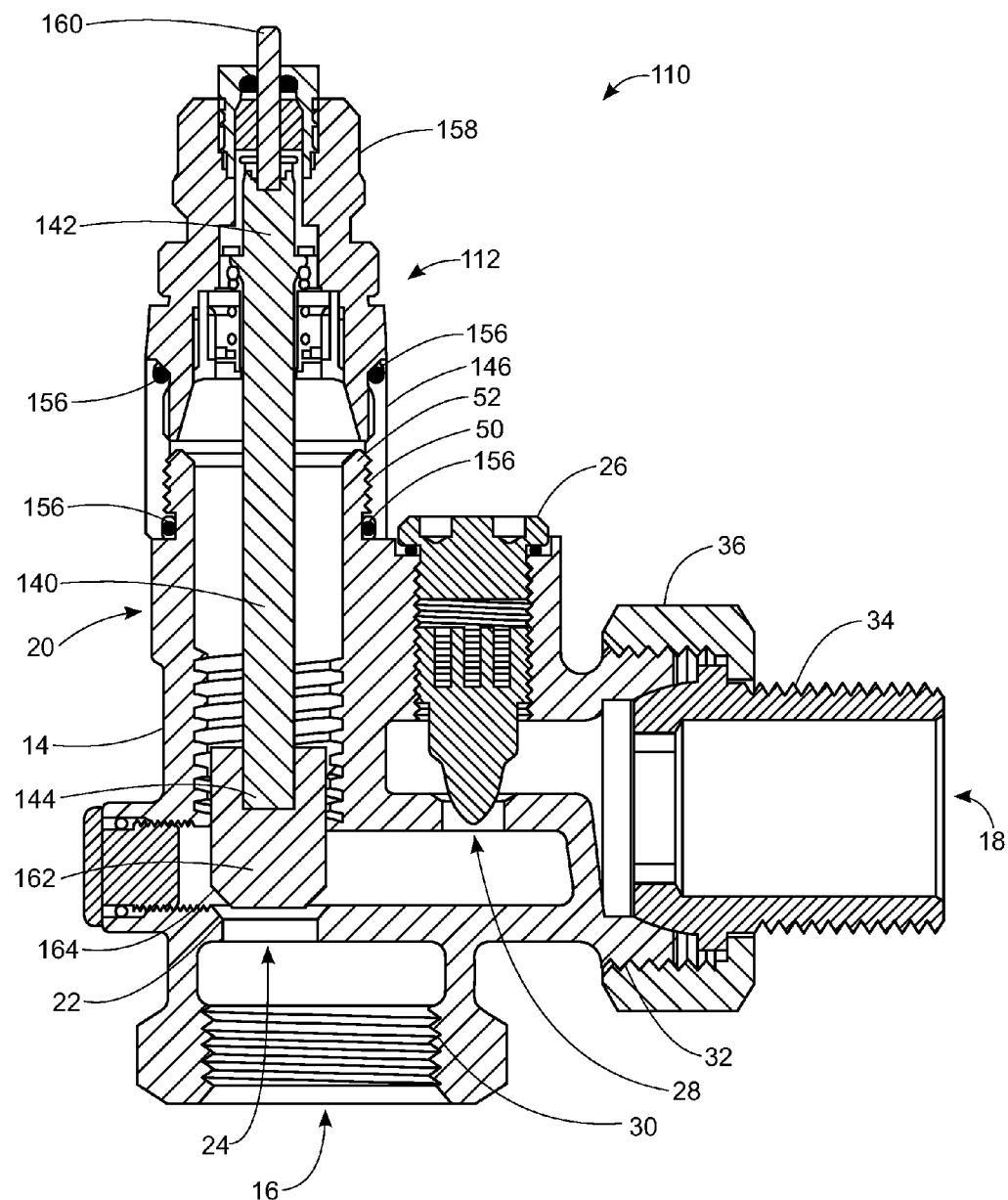
FIG. 3 is a cross-sectional side view of a valve with a TRV insert assembly according to an embodiment of the present invention.

Referring to FIG. 3, a valve 110 includes a TRV insert 112 installed into a valve body 14. Except where otherwise noted, reference numerals preceded by the number "1" indicate elements that are similar to the elements of the valve 10 shown in FIG. 1.

The insert 112 includes an actuator 158, a bonnet 146 and an extended valve stem 140. The actuator 158 is adapted to be connected to a thermostatic element or sensing system or apparatus (not shown), which may deliver a signal to or otherwise direct the actuator 158 to control the operation of the valve 110. The bonnet 146 is used to mount the insert 112 to the valve body 14, and includes a threaded interior chamber for rotatably securing the insert 112 to the threaded exterior 50 on the neck 52 of the valve housing 20. One or more seals, such as O-rings 156, may be positioned about the circumference of the neck 52 of the valve housing 20 prior to securing the bonnet 146 to the valve body 14, in order to strengthen the seal between the insert 112 and the valve body 14, and to avoid leaks or a loss of pressure from the system, and additional seals may be provided, where necessary. The extended valve stem 140 has a proximal end 142 which is mounted to be movable within the actuator 158, and includes a pin 160 which may be connected to a thermostatic element or sensing system or apparatus (not shown) in order to control the operation of the valve 110. The extended valve stem 140 also has a distal end 144 which extends into the valve housing 20 when the insert 112 is mounted to the valve body 14. The distal end 144 of the valve stem 140 is connected to a valve operator 162 that includes a replacement valve member 164 which is appropriately formed in order to mate with the existing valve seat 22 within the valve body 14.

The valve 110 has a "fully open" position and a "closed" position, and any number of positions between the "fully open" position and the "closed" position. In operation, the valve 110 is used to initiate flow when the actuator 158 raises the extended valve stem 140 in response to a control signal from a sensing system or apparatus (not shown). Raising the extended valve stem 140 lifts the replacement valve member 164 from the existing valve seat 22 and permits fluid to flow through the flow path defined within the valve body 14 as extending from the inlet 16 through the opening 24 and the orifice 28 to the outlet 18. As with the valve 10 shown in FIG. 1, the maximum rate of flow through the valve 110 is controlled based on the position of the regulator 26. The valve 110 is also used to isolate flow when the actuator 158 lowers the extended valve stem 140 in response to a control signal from a sensing system or apparatus (not shown). Lowering the extended valve stem 140 presses the replacement valve member 164 into the existing valve seat 22, which places the valve 110 into the closed position. When the valve 110 is closed, fluid is prevented from passing through the valve 110 from the inlet 16 to the outlet 18.

For example, when the insert 112 is installed into a heating system, the actuator 158 may direct the valve 110 to open or close based on a sensed condition within a space (i.e., to initiate flow when a temperature drops below a set point or to secure flow when temperature reaches a set point). The actuator 158 may also direct the valve to open or close at specified times (i.e., at certain times of the day or after a predetermined period of operation).

By installing a TRV insert 112 into a valve body 14, as is shown in FIG. 3, the advantages of automatic control of fluid flow may be implemented in existing fluid systems, such as hydronic or steam heating systems, without requiring an expensive and full-scale replacement of an entire valve. Removing only the internal components of the valve which relate to manual operation and leaving the valve body in place can greatly decrease both the time and cost required to complete installation, because a replacement insert may be made of significantly less material than is required to fabricate an entirely new valve body, and because the installation of a TRV insert into a fluid system does not require cutting or welding of existing valve pipes.

Figure 4:
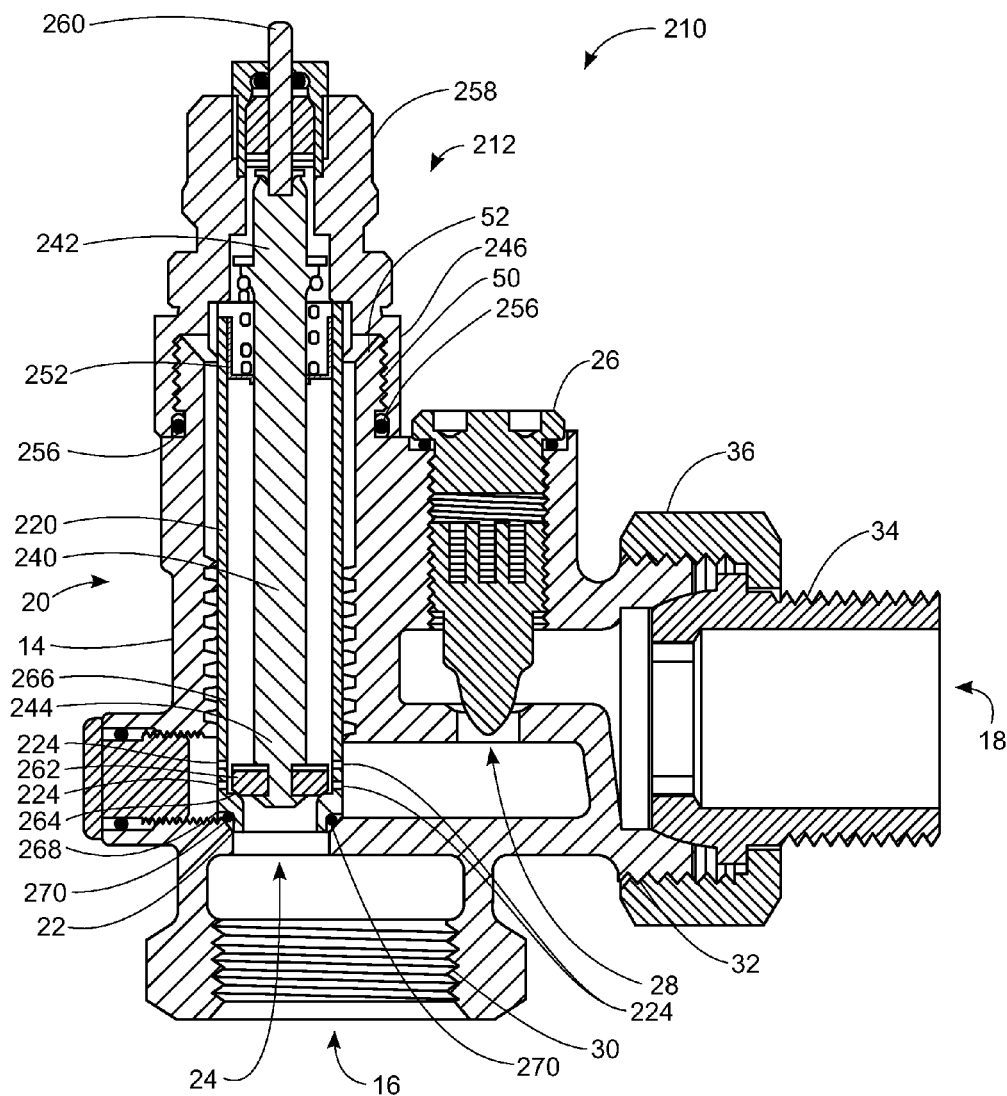
FIG. 4 is a cross-sectional side view of a valve with a TRV insert assembly according to another embodiment of the present invention.

Referring to FIG. 4, a valve 210 includes a TRV insert 212 installed into a valve body 14. Except where otherwise noted, reference numerals preceded by the number "2" indicate elements that are similar to the elements of the valve 110 which are identified by reference numerals preceded by the number "1" in FIG. 3.

The insert 212 includes an actuator 258, a bonnet 246, an inner housing 220 and an extended valve stem 240. The actuator 258 is adapted to connect to a thermostatic element, sensing system or other apparatus (not shown), for controlling the operation of the valve 210. The bonnet 246 is used to mount the insert 212 to the valve body 14, and includes a threaded interior chamber for rotatably securing the insert 212 to the threaded exterior 50 on the neck 52 of the valve housing 20. One or more seals, such as O-rings 256, may be positioned about the circumference of the neck 52 of the valve housing 20 prior to securing the bonnet 246 to the valve body 14, in order to strengthen the seal between the insert 212 and the valve body 14, and to avoid leaks or a loss of pressure from the system, and additional seals may be provided where necessary.

The extended valve stem 240 has a proximal end 242 which is mounted to be movable within the actuator 258, and includes a pin 260 which may be connected to a thermostatic element, sensing system or other apparatus (not shown) in order to control the operation of the valve 210. The extended valve stem 240 also includes a distal end 244 which extends into the valve housing 20 when the insert 212 is mounted to the valve body 14. The distal end 244 of the valve stem 240 is connected to a valve operator 262 that includes a replacement valve member 264.

The inner housing 220 is a tube-like structure that is sized to fit within the valve housing 20. The inner housing 220 has a proximal end 252 and a distal end 266, and is constructed to conform to the internal dimensions of the valve body 14, preferably in a substantially cylindrical shape. The proximal end 252 of the inner housing 220 is positioned near the bonnet 246 and the actuator 258 when the insert 212 is mounted to the valve body 14. At the distal end 266, an external sealing surface 268 is mounted along an outer surface of the inner housing 220, and a replacement valve seat 222 is mounted along an inner surface of the inner housing 220. The sealing surface 268 forms a seal with the original valve seat 22 of the valve body 14, while the replacement valve seat 222 is shaped to conform to the replacement valve member 264. One or more seals, such as O-rings 270, may be included between the external sealing surface 268 and the original valve seat 22, in order to strengthen the seal between the inner housing 220 and the valve body 14, and to avoid leaks or a loss of pressure from the system, and additional seals may be provided where necessary. The distal end 266 of the inner housing 220 also includes a plurality of flow holes 224 through which fluid may flow when the valve 210 is open. The flow holes 224 extend substantially perpendicular to the axis of the inner housing 220.

The valve 210 has a "fully open" position and a "closed" position, and any number of positions between the "fully open" position and the "closed" position. In operation, the valve 210 is used to initiate flow when the actuator 258 raises the extended valve stem 240 in response to a control signal from a sensing system or apparatus (not shown). Raising the extended valve stem 240 lifts the replacement valve member 264 from the valve seat 22 and permits fluid to flow through a flow path defined within the valve body 14 as extending from the inlet 16 through the opening 24, the plurality of flow holes 224 and the orifice 28 to the outlet 18. As with the valve 10 shown in FIG. 1, the maximum rate of flow through the valve 210 is controlled based on the position of the regulator 26.

The valve 210 is also used to isolate flow when the actuator 258 lowers the extended valve stem 240 in response to a control signal from a sensing system or apparatus (not shown). Lowering the extended valve stem 240 presses the replacement valve member 264 into the replacement valve seat 222, which places the valve 210 into the closed position. When the valve 210 is closed, the flow path within the valve body 14 is isolated, and fluid is prevented from passing through the valve 210 from the inlet 16 to the outlet 18.

Figure 5:
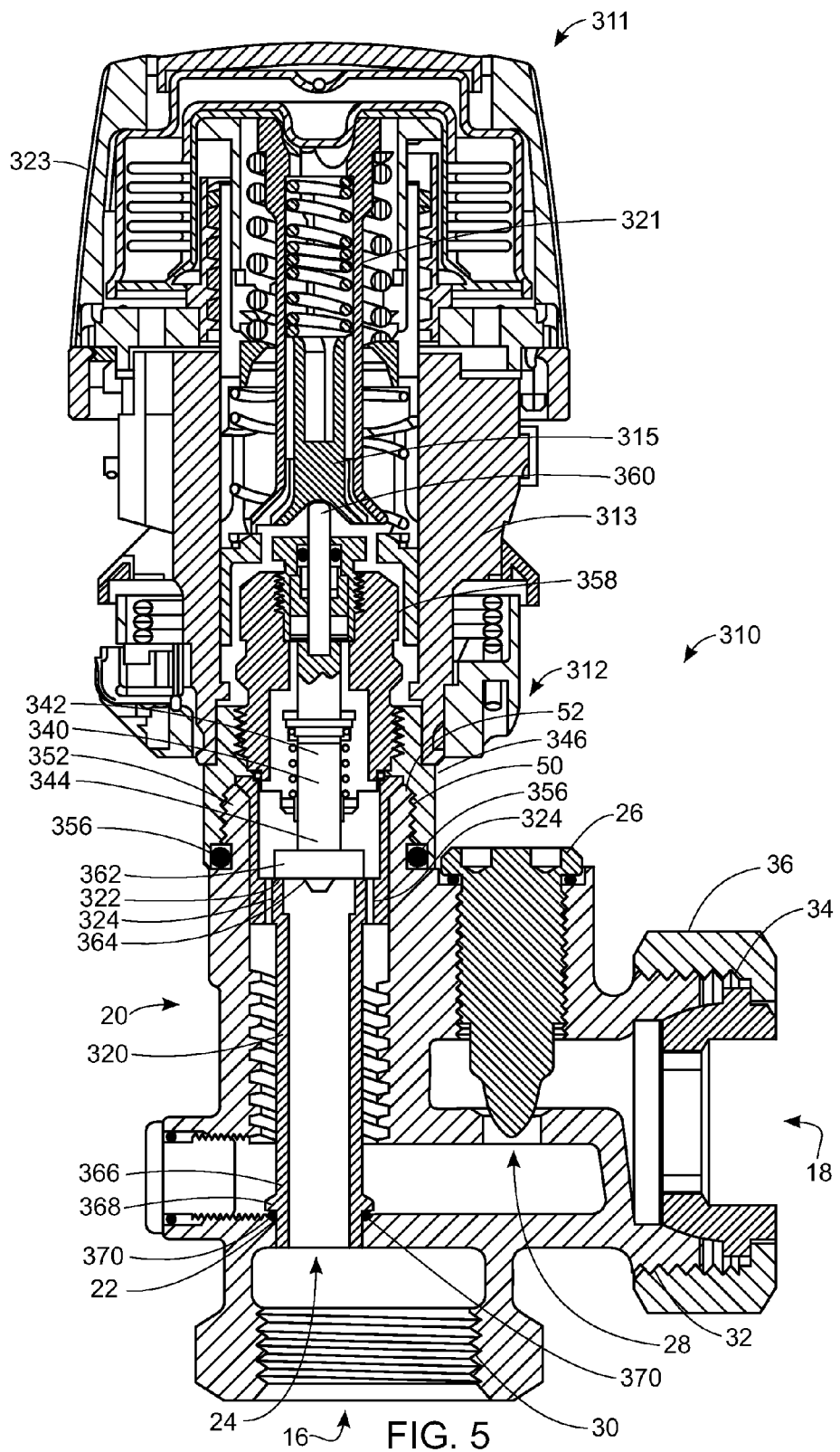
FIG. 5 is a cross-sectional side view of a valve with a TRV insert assembly according to another embodiment of the present invention.
Figure 6:
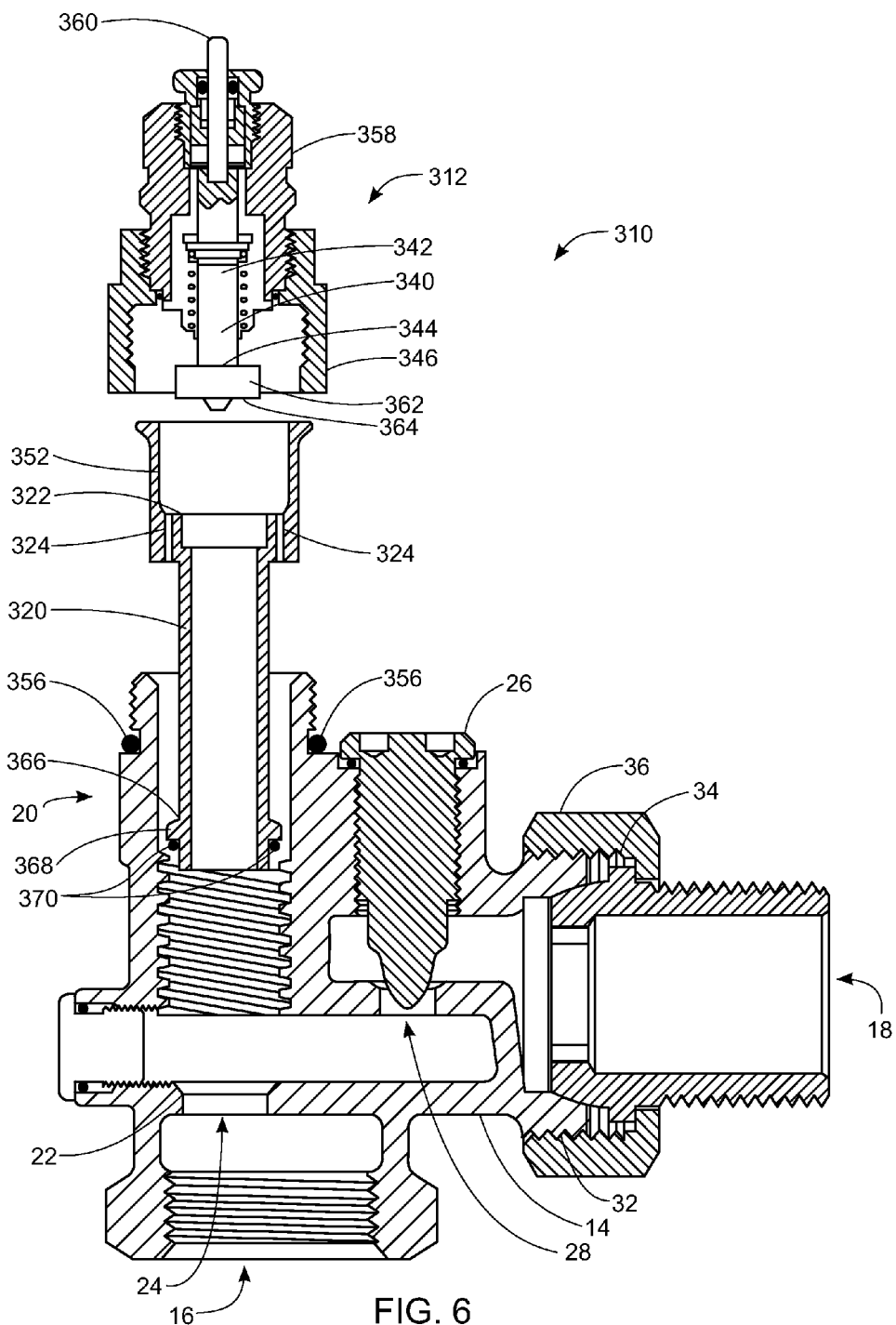
FIG. 6 is an exploded view of the valve and TRV insert assembly of FIG. 5.

Referring to FIG. 5, a valve 310 includes a TRV insert 312 installed into a valve body 14 and a thermostatic element 311 mounted to the insert 312. Except where otherwise noted, reference numerals preceded by the number "3" indicate elements that are similar to the elements of the valve 110 which are identified by reference numerals preceded by the number "1" in FIG. 3, or to the elements of the valve 210 which are identified by reference numerals preceded by the number "2" in FIG. 4. An exploded view of the valve body 14 and the valve insert 312 is shown in FIG. 6.

The insert 312 includes an actuator 358, a bonnet assembly 346, a valve stem 340 and an inner housing 320. The actuator 358 controls the operation of the valve 310, and the thermostatic element 311 is mounted to an exterior of the actuator 358. The bonnet assembly 346 is used to mount the insert 312 to the valve body 14, and includes a threaded interior chamber for rotatably securing the insert 312 to the threaded exterior 50 on the neck 52 of the valve housing 20. One or more seals, such as O-rings 356, may be positioned about the circumference of the neck 52, prior to securing the bonnet assembly 346 to the valve body 14, in order to strengthen the seal between the insert 312 and the valve body 14, and to avoid leaks or a loss of pressure from the system, and additional seals may be provided where necessary.

The valve stem 340 has a proximal end 342 which is mounted to be movable within the actuator 358, and includes a pin 360 which is connected to the thermostatic element 311. The valve stem 340 also includes a distal end 344 which extends into the inner housing 320 and the valve housing 20 when the insert 312 is mounted to be movable within the valve body 14. The distal end 344 of the valve stem 340 is connected to a valve operator 362 that includes a replacement valve member 364.

The inner housing 320 is a tube-like structure that is sized to fit within the valve housing 20 of the valve body 14, and is preferably formed in a substantially cylindrical shape. The inner housing 320 has a proximal end 352 and a distal end 366. The proximal end 352 of the inner housing 320 is positioned near the bonnet assembly 346 and the actuator 358 when the insert 312 is mounted to the valve body 14, and includes a replacement valve seat 322 which is shaped to conform to the replacement valve member 364. The proximal end 352 of the inner housing 320 also includes a plurality of flow holes 324 through which fluid may flow when the valve 310 is open. The flow holes 324 extend substantially parallel to the axis of the inner housing 320. At the distal end 366 of the inner housing 320, an external sealing surface 368 is mounted along an outer surface of the inner housing 320. One or more seals, such as lower O-ring 370, may be included between the sealing surface 368 and the original valve seat 22, in order to improve the quality of the seal between the inner housing 320 and the original valve seat 22.

The thermostatic element 311 may be an operator or other device that operates the valve 310 by providing a mechanical force to the pin 360 at the proximal end 342 of the valve stem 340. The thermostatic element 311 includes a base 313, a rod 315, a spring 321, and a cover 323, as well as a connection to a sensor or other system (not shown). The base 313 is used to mount the thermostatic element 311 to the actuator 358. The rod 315 is connected to the pin 360. In operation, the thermostatic element 311 provides a mechanical force to the pin 360, in order to raise or lower the valve stem 342 in response to a control signal that may be received from a sensor or other system. For example, if a temperature sensed in a space falls below or rises above a set point, the sensor may send a control signal to the thermostatic element 311, which may then open or close the valve 310, as necessary, in order to increase or decrease fluid flow to a radiator or other heating unit. The thermostatic element 311 may also be directed to operate the valve 310 based on a preset schedule or according to other instructions.

Although the thermostatic element 311 shown in FIG. 5 is a spring-loaded valve, any form of thermostatic element 311 may be utilized in accordance with the systems and methods of the present invention. Additionally, the cover 323 and the base 313 may be formed from a single, integral unit and the thermostatic element 311 may be mounted to the actuator 358, as shown, or to the valve body 14. The sensor or other system for providing a control signal may also be located external to the thermostatic element 311, or may be integrated within the thermostatic element 311.

The valve 310 has a "fully open" position and a "closed" position, and any number of positions between the "fully open" position and the "closed" position. In operation, the valve 310 is used to initiate flow when the actuator 358 raises the extended valve stem 340 in response to a control signal from a sensing system or apparatus (not shown).

Raising the extended valve stem 340 lifts the replacement valve member 364 from the replacement valve seat 322 and permits fluid to flow through a flow path defined within the valve body 14 as extending from the inlet 16 through the opening 24, upwardly through an interior of inner housing 320, downwardly through flow holes 324 and around the exterior of the inner housing 320 to orifice 28 and outlet 18. As with the valve 10 shown in FIG. 1, the maximum rate of flow through the valve 310 may be controlled based on the position of the regulator 26.

The valve 310 may also be used to isolate flow when the actuator 358 lowers the extended valve stem 340 in response to a control signal from a sensing system or apparatus (not shown). Lowering the extended valve stem 340 presses the replacement valve member 364 into the existing valve seat 22, which places the valve 310 into the closed position. When the valve 310 is closed, the flow path within the valve body 14 is isolated, and fluid is prevented from passing through the valve 310 from the inlet 16 to the outlet 18.

TRV inserts of the present invention, such as the insert 112 shown in FIG. 3, the insert 212 shown in FIG. 4 or the insert 312 shown in FIGS. 5 and 6 may be installed into any standard valve body in any fluid system. In order to prepare a valve body, such as the valve body 14 of the valve 10 shown in FIG. 1, to receive the installation of a TRV insert, the internal components of the valve 10 that are related to manual operation must first be removed. Therefore, the fluid system should be properly secured and drained, and the handwheel 58, should be removed from the valve stem 40. The packing nut 46 may then be released from the valve body 14, and the spring 54, the packing ring 56 and the valve stem 40 may then be removed, along with the valve operator 62 and the valve plate 64. Next, the valve seat 22 and the interior of the valve body 14 may be visually inspected, and the valve seat 22 may be cleaned or resurfaced, as is necessary, in order to accommodate the installation of the TRV insert. Any debris that may have entered the valve body 14, such as during either the manual operation of the valve 10 or the removal of manually operable components therefrom, may then be cleared. Once a TRV insert has been mounted and installed into the valve body 14, the fluid system may then be restored to normal operating pressures and temperatures, and checked for leaks. A sensing system or apparatus (not shown) may then be connected to the actuator.

Although the valves 110, 210, 310 shown in FIGS. 3-6 are isolation valves, through which the maximum rate of flow is controlled by the position of the regulator 26, TRV inserts according to the present invention may be installed into manually operated valves that are used to regulate the rate of fluid flow therethrough, such as throttle valves. TRV inserts may be used to control the rate of flow through such valves, based on the position of a valve operator between a fully open position and a closed position.

Components of TRV inserts of the present invention may be formed from any suitable material, such as forged brass, steel or other common materials from which valve parts may be formed. For example, the components may be formed from plastics or composite materials. Moreover, the components of the TRV inserts of the present invention may be formed from multiple materials. For example, a valve operator of the present invention may be formed from a metal base and may include a valve plate with an elastic sealing surface formed from rubber or another suitable material. The various seals of the present invention may also be formed from rubber or another suitable material.

It should be understood that, unless otherwise explicitly or implicitly indicated herein, any of the features, characteristics, alternatives or modifications described regarding a particular embodiment herein may also be applied, used, or incorporated with any other embodiment described herein. For example, it should be understood that the valve inserts of the present invention may be used as isolation valves or flow control valves, and may be installed in fluid systems other than those involving water or steam. Also, it should also be understood that the accompanying drawings are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As may be recognized by those of ordinary skill in the pertinent art based on the teachings herein, numerous changes and modifications may be made to the above-described and other embodiments of the present invention without departing from the spirit of the invention as defined in the claims. Accordingly, this detailed description of currently preferred embodiments is to be taken in an illustrative, as opposed to a limiting sense.

Although the invention has been described and illustrated with respect to exemplary embodiments thereof, the foregoing and various other additions and omissions may be made therein and thereto without departing from the spirit and scope of the present disclosure.

What is claimed is:

1. A thermostatic radiator valve insert comprising:
   an actuator;
   a valve stem;
   a replacement valve member joined to the valve stem;
   an inner housing comprising a replacement valve seat and a surface for forming a seal with an existing valve seat within a valve body, the inner housing having a longitudinal axis substantially coaxial to the valve stem; and
   a bonnet having a mating feature configured to engage a corresponding mating feature on the valve body for mounting the valve insert to the valve body,
   wherein the replacement valve member is shaped to conform to the replacement valve seat;
   wherein the inner housing defines at least a portion of a flow path between the inlet and the outlet;
   wherein the inner housing comprises a plurality of flow holes extending therethrough, the flow holes being substantially parallel to the longitudinal axis, and wherein the plurality of flow holes define at least a portion of the flow path, so that, during operation, fluid within the inner housing is permitted to flow toward the replacement valve member from the inlet and then to the outlet in a direction substantially opposite the direction of the fluid flowing toward the replacement valve member from the inlet; and
   wherein the inner housing permits counter-current, annular flow for at least a portion of the flow path.

2. The thermostatic radiator valve insert of claim 1, wherein a valve operator is mounted to a distal end of the valve stem, and wherein the replacement valve member is mounted to the valve operator.

3. The thermostatic radiator valve insert of claim 1, wherein the inner housing is a substantially cylindrical shape, wherein the replacement valve seat is integral to an interior surface of the inner housing, and wherein the surface is integral to an exterior surface of the inner housing.

4. The thermostatic radiator valve insert of claim 1, wherein the insert is adapted to be installed between an inlet and an outlet of the valve body.

5. The thermostatic radiator valve insert of claim 1, further comprising a thermostatic element, wherein the thermostatic element is configured to reposition the replacement valve member in response to a control signal.

6. The thermostatic radiator valve insert of claim 5, wherein the control signal is indicative of a condition within a space.

7. The thermostatic radiator valve insert of claim 6, wherein the condition is a temperature within the space.

8. A valve insert for use with a valve body in a fluid system, the valve insert comprising:
   a valve stem having a distal end and a proximal end;
   an actuator for driving the valve stem, wherein the proximal end of the valve stem is movable within the actuator;
   a replacement valve member mounted to the distal end of the valve stem;
   an inner housing having an upper seating surface, a lower seating surface and an internal seating surface; and
   a bonnet having a mating feature configured to engage a corresponding mating feature on the valve body for mounting the valve insert to the valve body,
   wherein the upper seating surface is adapted to be mounted between the actuator and an open end of the valve body;
   wherein the replacement valve member is adapted to conform to the internal seating surface;
   wherein the lower seating surface is adapted to conform to an original valve seat within the valve body;
   wherein the inner housing forms at least a portion of a flow path between an inlet of the valve body and an outlet of the valve body, so that, during operation, fluid within the inner housing is permitted to flow toward the replacement valve member from the inlet and then to the outlet in a direction substantially opposite the direction of the fluid flowing toward the replacement valve member from the inlet;
   wherein the inner housing is formed in a hollow cylindrical shape extending between the open end of the valve body and an inlet of the valve body;
   wherein the inner housing includes at least one flow hole extending between an external surface of the inner housing and an internal surface of the inner housing; and
   wherein the inner housing permits counter-current, annular flow for at least a portion of the flow path.

9. The valve insert of claim 8, wherein the upper seating surface and the lower seating surface are mounted on the external surface of the inner housing, and
   wherein the internal seating surface is mounted on the internal surface of the inner housing.

10. The valve insert of claim 8, further comprising a seal member between the lower seating surface and the original valve seat of the valve body.

11. The valve insert of claim 10, wherein the seal member is formed of a flexible polymer.

12. A method comprising:
identifying a manually operated valve in a fluid system, wherein the manually operated valve comprises an original valve member configured to mate with an original valve seat;
removing a portion of the manually operated valve from the fluid system, wherein the removed portion of the manually operated valve comprises the original valve member;
identifying a thermostatic radiator valve insert configured to regulate fluid flow in the fluid system, the thermostatic radiator valve insert including a bonnet having a mating feature configured to engage a corresponding mating feature on the valve body for mounting the thermostatic radiator valve insert to the manually operated valve, and an inner housing having a hollow cylindrical shape adapted to form at least a portion of a flow path between an inlet and an outlet of the manually operated valve, so that, during operation, fluid within the inner housing is permitted to flow toward the replacement valve member from the inlet and then to the outlet in a direction substantially opposite the direction of the fluid flowing toward the replacement valve member from the inlet;
installing the thermostatic radiator valve insert into the fluid system in place of the removed portion of the manually operated valve, wherein installing the thermostatic radiator valve insert comprises mating a portion of the thermostatic radiator valve insert with the original valve seat and mating the bonnet to the manually operated valve; and
wherein the inner housing permits counter-current, annular flow for at least a portion of the flow path.

13. The method of claim 12, wherein the portion of the thermostatic radiator valve insert comprises a replacement valve member.

14. The method of claim 13, wherein installing the thermostatic radiator valve insert into the fluid system in place of the removed portion of the manually operated valve further comprises:
preparing the original valve seat to accommodate a mating of the replacement valve member.

15. The method of claim 12, wherein the thermostatic radiator valve insert comprises an inner housing, and
wherein the portion of the thermostatic radiator valve insert is an external sealing surface of the inner housing.

16. The method of claim 15, wherein the inner housing defines a flow hole for the fluid flow.

17. The method of claim 12, wherein installing the thermostatic radiator valve insert into the fluid system in place of the removed portion of the manually operated valve further comprises:
inspecting the original valve seat prior to mating the portion of the thermostatic radiator valve insert with the original valve seat.

* * * * *